US009102833B2

United States Patent
Ito et al.

(10) Patent No.: US 9,102,833 B2
(45) Date of Patent: Aug. 11, 2015

(54) CURABLE RESIN COMPOSITION, CURABLE RESIN MOLDED BODY, CURED RESIN MOLDED BODY, METHOD FOR PRODUCING EACH OF SAME, AND LAMINATE BODY

(71) Applicant: LINTEC CORPORATION, Tokyo (JP)

(72) Inventors: Masaharu Ito, Tokyo (JP); Wataru Iwaya, Tokyo (JP); Hironobu Fujimoto, Tokyo (JP); Naoki Taya, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 14/365,943

(22) PCT Filed: Dec. 11, 2012

(86) PCT No.: PCT/JP2012/082052
§ 371 (c)(1),
(2) Date: Jun. 16, 2014

(87) PCT Pub. No.: WO2013/089092
PCT Pub. Date: Jun. 20, 2013

(65) Prior Publication Data
US 2014/0350187 A1     Nov. 27, 2014

(30) Foreign Application Priority Data

Dec. 16, 2011   (JP) ................................. 2011-276247

(51) Int. Cl.
| | | |
|---|---|---|
| *C08L 33/06* | (2006.01) | |
| *C08L 33/08* | (2006.01) | |
| *C08L 45/00* | (2006.01) | |
| *C08L 67/00* | (2006.01) | |
| *C08L 69/00* | (2006.01) | |
| *C08L 81/06* | (2006.01) | |
| *B05D 3/00* | (2006.01) | |
| *C08L 33/26* | (2006.01) | |
| *C08J 5/18* | (2006.01) | |
| *C09D 4/06* | (2006.01) | |
| *C08F 2/44* | (2006.01) | |
| *C08F 220/34* | (2006.01) | |
| *C08F 222/10* | (2006.01) | |
| *C08F 220/16* | (2006.01) | |
| *C08F 220/36* | (2006.01) | |
| *C08L 41/00* | (2006.01) | |
| *C08F 220/30* | (2006.01) | |

(52) U.S. Cl.
CPC ................ *C08L 81/06* (2013.01); *B05D 3/007* (2013.01); *C08F 2/44* (2013.01); *C08J 5/18* (2013.01); *C08L 33/066* (2013.01); *C08L 33/08* (2013.01); *C08L 33/26* (2013.01); *C08L 45/00* (2013.01); *C08L 67/00* (2013.01); *C08L 69/00* (2013.01); *C09D 4/06* (2013.01); *C08F 220/16* (2013.01); *C08F 220/34* (2013.01); *C08F 220/36* (2013.01); *C08F 222/1006* (2013.01); *C08F 2220/301* (2013.01); *C08L 33/06* (2013.01); *C08L 41/00* (2013.01); *C08L 2203/16* (2013.01)

(58) Field of Classification Search
CPC ........... C09D 4/06; C08L 33/08; C08L 41/00; C08L 45/00; C08L 69/00; C08L 81/06
USPC ................ 525/185, 210, 293, 309, 905, 906; 427/385.5
See application file for complete search history.

(56) References Cited

U.S. PATENT DOCUMENTS

| | | |
|---|---|---|
| 4,108,827 A | 8/1978 | La Liberte |
| 4,139,694 A | 2/1979 | Laliberte |

FOREIGN PATENT DOCUMENTS

| | | |
|---|---|---|
| JP | 53-77246 | 7/1978 |
| JP | 6-16720 A | 1/1994 |
| JP | 10-77321 A | 3/1998 |
| JP | 2000-319483 A | 11/2000 |
| JP | 2001-56631 A | 2/2001 |
| JP | 2004-238532 A | 8/2004 |
| JP | 2007-254620 A | 10/2007 |
| JP | 2012-8547 A | 1/2012 |

OTHER PUBLICATIONS

Solvay Specialty Polymers Udel P-1800 Polysulfone (PSU) Data Sheet, 2 pages (Undated).*
International Search Report, issued in PCT/JP2012/082052, dated Mar. 26, 2013.

* cited by examiner

*Primary Examiner* — Fred M Teskin
(74) *Attorney, Agent, or Firm* — Birch, Stewart, Kolasch & Birch, LLP

(57) ABSTRACT

Provided is a curable resin composition comprising a thermoplastic resin (A) that includes a cyclic structure in its main chain, and has a glass transition temperature (Tg) of 140° C. or more, and a monofunctional curable monomer (B). The present invention provides: a cured resin formed article that has heat resistance and low birefringence, a method for producing the same, a curable resin composition and a curable resin formed article that are useful as a raw material for producing the cured resin formed article, and a laminate that includes a layer formed of a cured resin.

7 Claims, No Drawings

CURABLE RESIN COMPOSITION, CURABLE RESIN MOLDED BODY, CURED RESIN MOLDED BODY, METHOD FOR PRODUCING EACH OF SAME, AND LAMINATE BODY

TECHNICAL FIELD

The invention relates to a cured resin formed article that has heat resistance and low birefringence, a method for producing the same, a curable resin composition and a curable resin formed article that are useful as a raw material for producing the cured resin formed article, and a laminate that includes a layer formed of a cured resin.

BACKGROUND ART

In recent years, use of a transparent plastic film as an electrode substrate instead of a glass sheet has been studied for displays (e.g., liquid crystal display and electroluminescence (EL) display) in order to implement a reduction in thickness, a reduction in weight, an improvement in flexibility, and the like.

A transparent plastic film used for these applications is normally required to have heat resistance and low birefringence.

A melt extrusion method and a solution casting method have been known as a method for producing a heat-resistant optical film. However, a film obtained using a melt extrusion method tends to have large in-plane retardation. A film obtained using a solution casting method has reduced in-plane retardation, but has a problem in that the molecular chain may be oriented in the thickness direction when drying the solvent, and an increase in retardation in the thickness direction may easily occur.

Patent Document 1 discloses a resin composition that includes an amorphous thermoplastic resin and a bis(meth)acrylate that can be cured by applying active energy rays as a resin composition that may be used as an alternative to glass and exhibits good chemical resistance and heat resistance. A member obtained using the resin composition is described in the examples of Patent Document 1. However, Patent Document 1 is silent about the birefringence of the member.

RELATED-ART DOCUMENT

Patent Document

Patent Document 1: JP-A-10-77321

SUMMARY OF THE INVENTION

Technical Problem

The invention was conceived in view of the above situation. An object of the invention is to provide a cured resin formed article that has heat resistance and low birefringence, a method for producing the same, a curable resin composition and a curable resin formed article that are useful as a raw material for producing the cured resin formed article, and a laminate that includes a layer formed of a cured resin.

Solution to Problem

The inventors of the invention conducted extensive studies in order to achieve the above object. As a result, the inventors found that (a) a cured resin formed article that has heat resistance and low birefringence can be obtained by utilizing a curable resin composition that includes a thermoplastic resin that includes a cyclic structure in its main chain, and has a glass transition temperature (Tg) of 140° C. or more, and a monofunctional curable monomer, and (b) a cured resin formed article that has small in-plane retardation and small retardation in the thickness direction can be obtained when the cured resin formed article is formed in the shape of a film. The inventors also found that the cured resin formed article in the shape of a film can be efficiently obtained by forming a curable resin layer on a casting sheet using the curable resin composition, and curing the curable resin layer. These findings have led to the completion of the invention.

A first aspect of the invention provides the following curable resin composition (see (1) to (6)).

(1) A curable resin composition including a thermoplastic resin (A) that includes a cyclic structure in its main chain, and has a glass transition temperature (Tg) of 140° C. or more, and a monofunctional curable monomer (B).
(2) The curable resin composition according to (1), wherein the thermoplastic resin (A) is an amorphous thermoplastic resin.
(3) The curable resin composition according to (1), wherein the thermoplastic resin (A) is at least one thermoplastic resin selected from the group consisting of a polysulfone-based resin, a polyarylate-based resin, a polycarbonate-based resin, and an alicyclic hydrocarbon-based resin.
(4) The curable resin composition according to (1), wherein the monofunctional curable monomer (B) is a monofunctional (meth)acrylic acid derivative.
(5) The curable resin composition according to (4), wherein the monofunctional (meth)acrylic acid derivative is at least one monofunctional (meth)acrylic acid derivative selected from the group consisting of a (meth)acrylic acid derivative that includes a nitrogen atom, a (meth)acrylic acid derivative having an alicyclic structure, and a (meth)acrylic acid derivative having an ether structure.
(6) The curable resin composition according to (1), the curable resin composition including the thermoplastic resin (A) and the monofunctional curable monomer (B) in a mass ratio (thermoplastic resin (A):monofunctional curable monomer (B)) of 30:70 to 90:10.

A second aspect of the invention provides the following curable resin formed article (see (7) and (8)).
(7) A curable resin formed article obtained by forming the curable resin composition according to any one of (1) to (6).
(8) The curable resin formed article according to (7), the curable resin formed article being a film-like article.

A third aspect of the invention provides the following cured resin formed article (see (9)).
(9) A cured resin formed article obtained by curing the curable resin formed article according to (7) or (8).

A fourth aspect of the invention provides the following method for producing a cured resin formed article (see (10)).
(10) A method for producing the cured resin formed article according to (9), the method including:
a step 1 that forms a curable resin layer on a casting sheet, the curable resin layer being formed of the curable resin composition that includes the thermoplastic resin (A) and the monofunctional curable monomer (B); and
a step 2 that cures the curable resin layer obtained by the step 1 to form a cured resin layer.

A fifth aspect of the invention provides the following laminate (see (11)).
(11) A laminate including at least one layer that is formed of a cured resin obtained by curing the curable resin composition according to any one of (1) to (6).

Advantageous Effects of the Invention

A curable resin formed article can be efficiently obtained by utilizing the curable resin composition according to the first aspect of the invention, and a cured resin formed article that has heat resistance and low birefringence can be efficiently obtained by curing the curable resin formed article.

In particular, when the cured resin formed article is in the shape of a film, the cured resin formed article has small in-plane retardation and small retardation in the thickness direction. Therefore, the cured resin formed article may be useful as a resin film for producing an optical member or an electronic device member.

The cured resin formed article (film-like article) according to the third aspect of the invention may be used as a layer that is included in a laminate. The laminate may suitably be used for an electrode material for a touch panel and the like, a flat-screen television, an optical recording medium, and an optical sheet material.

The method for producing a cured resin formed article according to the fourth aspect of the invention can efficiently produce a cured resin formed article that has heat resistance and low birefringence.

The method for producing a cured resin formed article according to the fourth aspect of the invention is particularly suitable when continuously producing a film-like cured resin formed article.

DESCRIPTION OF EMBODIMENTS

A curable resin composition, a curable resin formed article, a cured resin formed article, a method for producing a cured resin formed article, and a laminate according to several exemplary embodiments of the invention are described in detail below.

1) Curable Resin Composition

A curable resin composition according to one embodiment of the invention includes a thermoplastic resin (A) that includes a cyclic structure in its main chain, and has a glass transition temperature (Tg) of 140° C. or more, and a monofunctional curable monomer (B).

Note that the above thermoplastic resin may be simply referred to as "thermoplastic resin (A)".

Thermoplastic Resin (A)

The thermoplastic resin (A) includes a cyclic structure in its molecule, and has a glass transition temperature (Tg) of 140° C. or more.

A thermoplastic resin that includes a cyclic structure in its main chain normally has an inherent positive birefringence value. The monofunctional curable monomer (B) normally has an inherent negative birefringence value. A cured resin formed article having low birefringence can be obtained by appropriately combining a thermoplastic resin and a monofunctional curable monomer.

Examples of the cyclic structure included in the thermoplastic resin (A) include an aromatic ring structure and an alicyclic structure.

The number of carbon atoms of the cyclic structure included in the thermoplastic resin (A) is normally 5 to 30, and preferably 6 to 20.

The aromatic ring structure is not particularly limited. The aromatic ring structure is preferably a benzene ring, a biphenyl ring, a naphthalene ring, a terphenyl ring, or an anthracene ring, more preferably a benzene ring, a biphenyl ring, or a naphthalene ring, and particularly preferably a benzene ring, from the viewpoint of availability of the raw material.

The alicyclic structure is not particularly limited. The alicyclic structure is preferably a cycloalkane structure or a cycloolefin structure.

The glass transition temperature (Tg) of the thermoplastic resin (A) is 140° C. or more, and preferably 150° C. or more. When the glass transition temperature (Tg) of the thermoplastic resin (A) is 140° C. or more, a cured resin formed article that exhibits excellent heat resistance can be obtained. The upper limit of the glass transition temperature (Tg) of the thermoplastic resin (A) is not particularly limited, but is normally 350° C. or less.

The term "glass transition temperature (Tg)" used herein refers to a temperature that corresponds to the maximum tan δ value (loss modulus/storage modulus) obtained by viscoelasticity measurement.

The thermoplastic resin (A) is preferably an amorphous thermoplastic resin. When the thermoplastic resin (A) is an amorphous thermoplastic resin, a cured resin formed article that exhibits excellent transparency can be obtained. Since an amorphous thermoplastic resin exhibits excellent solubility in an organic solvent, a cured resin formed article can be efficiently formed by utilizing a solution casting method (described later). Note that the term "amorphous thermoplastic resin" used herein refers to a thermoplastic resin for which a melting point is not observed by differential scanning calorimetry.

The weight average molecular weight (Mw) of the thermoplastic resin (A) is normally 8000 to 3,000,000, preferably 10,000 to 2,000,000, and more preferably 100,000 to 2,000,000. The molecular weight distribution (Mw/Mn) of the thermoplastic resin (A) is preferably 1.0 to 5.0, and more preferably 2.0 to 4.5. Note that the terms "weight average molecular weight (Mw)" and "molecular weight distribution (Mw/Mn)" used herein refer to values determined by gel permeation chromatography (GPC) relative to a polystyrene standard (i.e., polystyrene-reduced values).

Specific examples of the thermoplastic resin (A) include a polysulfone-based resin, a polyarylate-based resin, a polycarbonate-based resin, an alicyclic hydrocarbon-based resin, and the like. Among these, the polysulfone-based resin is preferable from the viewpoint of heat resistance.

The term "polysulfone-based resin" used herein refers to a polymer that includes a sulfone group ($-SO_2-$) in the main chain. The polysulfone-based resin is not particularly limited. A known polysulfone-based resin may be used. Examples of the polysulfone-based resin include a resin that includes a polymer compound including a repeating unit among the repeating units respectively represented by the following formulas (a) to (h).

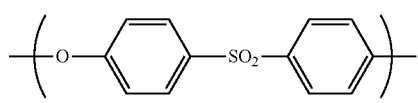

(a)

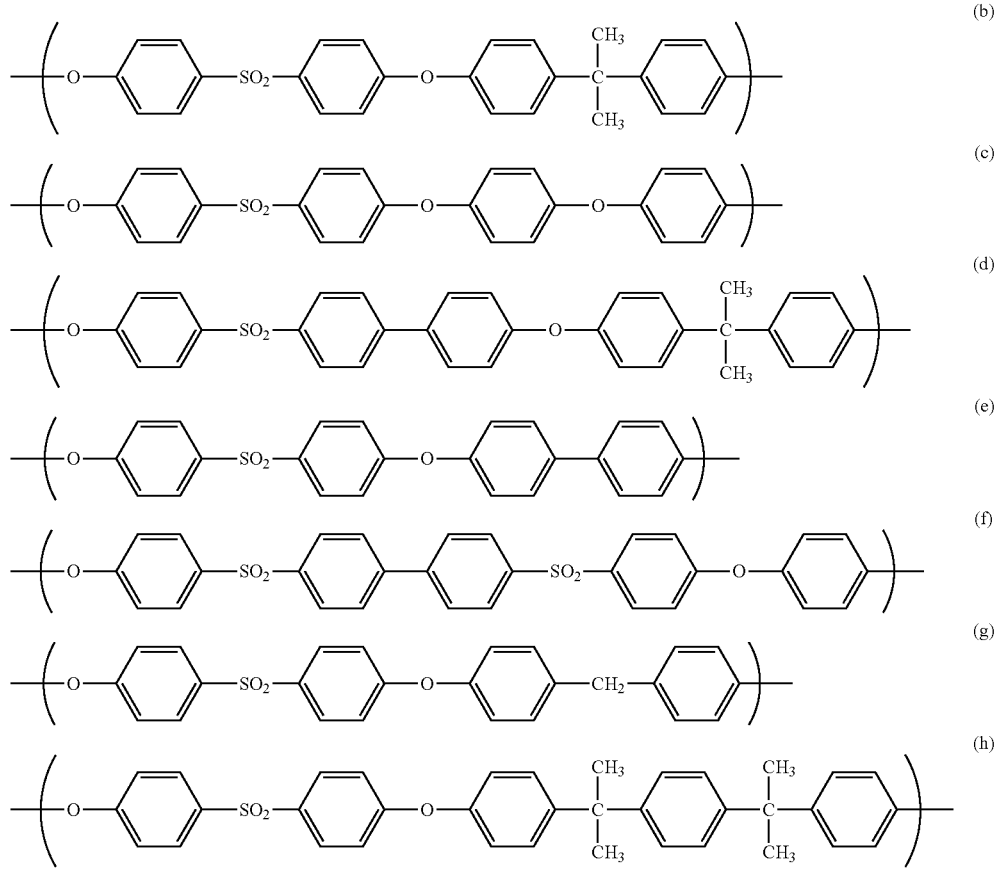

Specific examples of the polysulfone-based resin include a polyethersulfone resin (i.e., a resin that includes a polymer compound including the repeating unit represented by the formula (a)), a polysulfone resin (i.e., a resin that includes a polymer compound including the repeating unit represented by the formula (b)), a polyphenylsulfone resin (i.e., a resin that includes a polymer compound including the repeating unit represented by the formula (e)), and the like. The polysulfone-based resin may be a modified polysulfone-based resin.

A polyethersulfone resin or a polysulfone resin is preferable as the polysulfone-based resin.

The term "polyarylate-based resin" used herein refers to a resin that includes a polymer compound that is obtained by reacting an aromatic diol with an aromatic dicarboxylic acid or a chloride thereof. The polyarylate-based resin is not particularly limited. A known polyarylate-based resin may be used. The reaction method is not particularly limited. For example, a melt polymerization method, a solution polymerization method, or an interfacial polymerization method may be used.

Examples of the aromatic diol include bis(hydroxyphenyl) alkanes such as bis(4-hydroxyphenyl)methane (bisphenol F), bis(3-methyl-4-hydroxyphenyl)methane, 1,1-bis(4'-hydroxyphenyl)ethane, 1,1-bis(3'-methyl-4'-hydroxyphenyl)ethane, 2,2-bis(4'-hydroxyphenyl)propane (bisphenol A), 2,2-bis(3'-methyl-4'-hydroxyphenyl)propane, 2,2-bis(4'-hydroxyphenyl)butane, and 2,2-bis(4'-hydroxyphenyl)octane; bis(hydroxyphenyl)cycloalkanes such as 1,1-bis(4'-hydroxyphenyl)cyclopentane, 1,1-bis(4'-hydroxyphenyl)cyclohexane (bisphenol Z), and 1,1-bis(4'-hydroxyphenyl)-3,3,5-trimethylcyclohexane; bis(hydroxyphenyl) phenylalkanes such as bis(4-hydroxyphenyl)phenylmethane, bis(3-methyl-4-hydroxyphenyl)phenylmethane, bis(2,6-dimethyl-4-hydroxyphenyl)phenylmethane, bis(2,3,6-trimethyl-4-hydroxyphenyl)phenylmethane, bis(3-t-butyl-4-hydroxyphenyl)phenylmethane, bis(3-phenyl-4-hydroxyphenyl)phenylmethane, bis(3-fluoro-4-hydroxyphenyl)phenylmethane, bis(3-bromo-4-hydroxyphenyl)phenylmethane, bis(4-hydroxyphenyl)-4-fluorophenylmethane, bis(3-fluoro-4-hydroxyphenyl)-4-fluorophenylmethane, bis(4-hydroxyphenyl)-4-chlorophenylmethane, bis(4-hydroxyphenyl)-4-bromophenylmethane, bis(3,5-dimethyl-4-hydroxyphenyl)-4-fluorophenylmethane, 1,1-bis(4'-hydroxyphenyl)-1-phenylethane (bisphenol P), 1,1-bis(3'-methyl-4'-hydroxyphenyl)-1-phenylethane, 1,1-bis(3'-t-butyl-4'-hydroxyphenyl)-1-phenylethane, 1,1-bis(3'-phenyl-4'-hydroxyphenyl)-1-phenylethane, 1,1-bis(4'-hydroxyphenyl)-1-(4'-nitrophenyl)ethane, 1,1-bis(3'-bromo-4'-hydroxyphenyl)-1-phenylethane, 1,1-bis(4'-hydroxyphenyl)-1-phenylpropane, bis(4-hydroxyphenyl)diphenylmethane, and bis(4-hydroxyphenyl)dibenzylmethane; bis(hydroxyphenyl)ethers such as bis(4-hydroxyphenyl)ether and bis(3-methyl-4-hydroxyphenyl) ether; bis(hydroxyphenyl)ketones such as bis(4-hydroxyphenyl)ketone and bis(3-methyl-4-hydroxyphenyl) ketone; bis(hydroxyphenyl)sulfides such as bis(4-hydroxyphenyl)sulfide and bis(3-methyl-4-hydroxyphenyl) sulfide; bis(hydroxyphenyl)sulfoxides such as bis(4-hydroxyphenyl)sulfoxide and bis(3-methyl-4- hydroxyphenyl)sulfoxide; bis(hydroxyphenyl)sulfones such as bis(4-hydroxyphenyl)sulfone (bisphenol S) and bis(3-methyl-4-hydroxyphenyl)sulfone; bis(hydroxyphenyl)fluorenes such as 9,9-bis(4'-hydroxyphenyl)fluorene and 9,9-bis(3'-methyl-4'-hydroxyphenyl)fluorene; and the like.

Examples of the aromatic dicarboxylic acid or a chloride thereof include phthalic acid, isophthalic acid, terephthalic acid, 4,4'-biphenyldicarboxylic acid, diphenoxyethanedicarboxylic acid, diphenyl ether 4,4'-dicarboxylic acid, 4,4'-diphenylsulfonedicarboxylic acid, 1,5-napthalenedicarboxylic acid, 2,6-napthalenedicarboxylic acid, chlorides thereof, and the like.

The polyarylate-based resin may be a modified polyarylate-based resin.

A resin that includes a polymer compound obtained by reacting 2,2-bis(4'-hydroxyphenyl)propane with isophthalic acid is preferable as the polyarylate-based resin.

The term "polycarbonate-based resin" used herein refers to a polymer that includes a carbonate group (—O—C(=O)—O—) in the main chain.

The polycarbonate-based resin is not particularly limited. A known polycarbonate-based resin may be used. Examples of the polycarbonate-based resin include an aromatic polycarbonate resin, an aliphatic polycarbonate resin, and the like. The aromatic polycarbonate resin is preferable due to excellent heat resistance, mechanical strength, transparency, and the like.

The aromatic polycarbonate resin may be obtained by reacting an aromatic diol and a carbonate precursor using an interfacial polycondensation method or a melt transesterification method, or polymerizing a carbonate prepolymer using a solid-phase transesterification method, or polymerizing a cyclic carbonate compound using a ring-opening polymerization method.

Examples of the aromatic diol include those mentioned above in connection with the polyarylate-based resin.

Examples of the carbonate precursor include a carbonyl halide, a carbonate ester, a haloformate, and the like. Specific examples of the carbonate precursor include phosgene, a diphenyl carbonate, a dihaloformate of a dihydric phenol, and the like.

These thermoplastic resins (A) may be used either alone or in combination.

The term "alicyclic hydrocarbon-based resin" used herein refers to a polymer that includes a cyclic hydrocarbon group in the main chain. The alicyclic hydrocarbon-based resin is not particularly limited. A known alicyclic hydrocarbon-based resin may be used. Examples of the alicyclic hydrocarbon-based resin include a homopolymer or a copolymer of a cyclic olefin (i.e., norbornene-based monomer), and the like. Examples of the alicyclic hydrocarbon-based resin include a monocyclic olefin-based polymer, a norbornene-based polymer, a cyclic conjugated diene-based polymer, a vinyl alicyclic hydrocarbon-based polymer, and hydrogenated products thereof. Specific examples of the alicyclic hydrocarbon-based resin include APEL (ethylene-cycloolefin copolymer manufactured by Mitsui Chemicals Inc.), ARTON (norbornene polymer manufactured by JSR Corporation), ZEONOR (norbornene polymer manufactured by Zeon Corporation), and the like.

These thermoplastic resins (A) may be used either alone or in combination.

Monofunctional Curable Monomer (B)

The monofunctional curable monomer (B) is a monomer that includes one polymerizable unsaturated bond, and can take part in a polymerization reaction, or a polymerization reaction and a crosslinking reaction. Note that the term "curing" used herein is a broad concept that includes a polymerization reaction of a monomer, or a polymerization reaction of a monomer, and the subsequent crosslinking reaction of the polymer.

When producing a film-like curable resin formed article (hereinafter may be referred to as "curable resin film") using the curable resin composition according to one embodiment of the invention, the curable resin film is plasticized due to the monofunctional curable monomer (B). For example, when producing a curable resin film using a solution casting method or the like, the curable resin film is plasticized when the curable resin composition includes the monofunctional curable monomer (B). This makes it possible to efficiently remove the solvent molecules from the curable resin film during drying. Therefore, an increase in drying time, and curling due to a residual solvent that may occur when using the thermoplastic resin (A) having a high glass transition temperature (Tg), can be prevented by utilizing the curable resin composition according to one embodiment of the invention that includes the monofunctional curable monomer (B).

The monofunctional curable monomer (B) normally has a negative birefringence value. A cured resin formed article having low birefringence can be obtained by combining the monofunctional curable monomer (B) with the thermoplastic resin (A) that has a positive birefringence value. In particular, in-plane retardation and retardation in the thickness direction can be reduced.

The molecular weight of the monofunctional curable monomer (B) is preferably 3000 or less, more preferably 50 to 2000, and still more preferably 100 to 1000.

The polymerizable unsaturated bond included in the monofunctional curable monomer (B) is not particularly limited as long as the polymerizable unsaturated bond can take part in the curing reaction. It is preferable that the polymerizable unsaturated bond be a polymerizable unsaturated bond included in a (meth)acryloyl group due to excellent reactivity. Note that the term "(meth)acryloyl group" refers to "acryloyl group" or "methacryloyl group".

A monofunctional (meth)acrylic acid derivative may preferably be used as the monofunctional curable monomer (B).

The monofunctional (meth)acrylic acid derivative is not particularly limited. A known compound may be used as the monofunctional (meth)acrylic acid derivative. Examples of the monofunctional (meth)acrylic acid derivative include a (meth)acrylic acid derivative that includes a nitrogen atom, a (meth)acrylic acid derivative having an alicyclic structure, a (meth)acrylic acid derivative having an ether structure, a (meth)acrylic acid derivative that includes an aromatic ring, and the like.

Examples of the (meth)acrylic acid derivative that includes a nitrogen atom include compounds respectively represented by the following formulas.

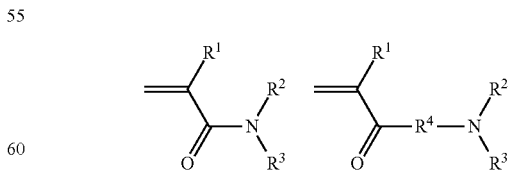

wherein $R^1$ is a hydrogen atom or an alkyl group having 1 to 6 carbon atoms, $R^2$ and $R^3$ are independently a hydrogen atom or an organic group having 1 to 12 carbon atoms, provided that $R^2$ and $R^3$ optionally bond to each other to form a cyclic structure, and $R^4$ is a divalent organic group.

Examples of the alkyl group having 1 to 6 carbon atoms represented by $R^1$ include a methyl group, an ethyl group, a propyl group, and the like. Among these, a methyl group is preferable.

Examples of the organic group having 1 to 12 carbon atoms represented by $R^2$ and $R^3$ include alkyl groups such as a methyl group, an ethyl group, and a propyl group; cycloalkyl groups such as a cyclopentyl group and a cyclohexyl group; and aromatic groups such as a phenyl group, a biphenyl group, and a naphthyl group. These groups may be substituted with a substituent at an arbitrary position. $R^2$ and $R^3$ optionally bond to each other to form a ring, which may include a nitrogen atom or an oxygen atom in its skeleton.

Examples of the divalent organic group represented by $R^4$ include groups respectively represented by —NH—, —NH—$(CH_2)_m$—, and —O—$(CH_2)_m$—. Note that m is an integer from 1 to 10.

Examples of a preferable (meth)acrylic acid derivative that includes a nitrogen atom include dimethylacrylamide and N-(meth)acryloylmorpholine represented by the following formulas.

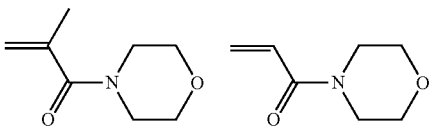

Examples of the (meth)acrylic acid derivative having an alicyclic structure include a compound represented by the following formula.

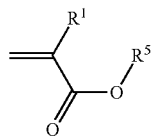

wherein $R^1$ is the same as defined above, and $R^5$ is a group having an alicyclic structure.

Examples of the group having an alicyclic structure represented by $R^5$ include a cyclohexyl group, an isobornyl group, a 1-adamantyl group, a 2-adamantyl group, a tricyclodecanyl group, and the like.

Specific examples of the (meth)acrylic acid derivative having an alicyclic structure include isobornyl(meth)acrylate, cyclohexyl(meth)acrylate, 1-adamantyl(meth)acrylate, 2-adamantyl(meth)acrylate, and the like.

Examples of the (meth)acrylic acid derivative having an ether structure include a compound represented by the following formula.

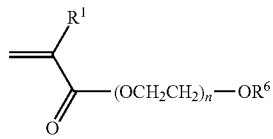

wherein $R^1$ is the same as defined above, and $R^6$ is an organic group having 1 to 12 carbon atoms. Examples of the organic group having 1 to 12 carbon atoms represented by $R^6$ include alkyl groups such as a methyl group, an ethyl group, and a propyl group; cycloalkyl groups such as a cyclopentyl group and a cyclohexyl group; and aromatic groups such as a phenyl group, a biphenyl group, and a naphthyl group. n is an integer from 1 to 20.

Specific examples of the (meth)acrylic acid derivative having an ether structure include ethoxylated o-phenylphenol (meth)acrylate and phenoxy polyethylene glycol (meth)acrylate respectively represented by the following formulas.

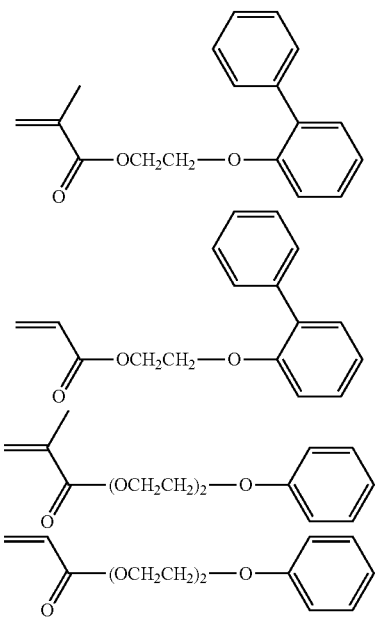

Examples of the (meth)acrylic acid derivative that includes an aromatic ring include benzyl(meth)acrylate and the like.

The (meth)acrylic acid derivative that includes a nitrogen atom is preferable as the monofunctional curable monomer (B) in that a cured resin formed article that exhibits excellent heat resistance can be obtained. The (meth)acrylic acid derivative having an alicyclic structure is preferable as the monofunctional curable monomer (B) from the viewpoint of optical properties. The (meth)acrylic acid derivative having an ether structure is preferable as the monofunctional curable monomer (B) from the viewpoint of toughness.

These monofunctional curable monomers (B) may be used either alone or in combination.

The curable resin composition preferably includes the thermoplastic resin (A) and the monofunctional curable monomer (B) in a mass ratio (thermoplastic resin (A):monofunctional curable monomer (B)) of 30:70 to 90:10, and more preferably 35:65 to 80:20.

If the curable resin composition includes the monofunctional curable monomer (B) so that the mass ratio (thermoplastic resin (A):monofunctional curable monomer (B)) exceeds 30:70, the flexibility of the resulting cured resin formed article may deteriorate. If the curable resin composition includes the monofunctional curable monomer (B) so that the mass ratio (thermoplastic resin (A):monofunctional curable monomer (B)) is less than 90:10, the resulting cured resin formed article may not have low birefringence.

The curable resin composition according to one embodiment of the invention may include a polyfunctional curable monomer in addition to the monofunctional curable monomer (B) as long as an increase in birefringence does not occur.

Examples of the polyfunctional curable monomer include a polyfunctional (meth)acrylic acid derivative.

Examples of the polyfunctional (meth)acrylic acid derivative include bifunctional (meth)acrylic acid derivatives such as tricyclodecanedimethanol di(meth)acrylate, polyethylene glycol di(meth)acrylate, propoxylated-ethoxylated bisphenol A di(meth)acrylate, ethoxylated bisphenol A di(meth)acrylate, tricyclodecanedimethanol di(meth)acrylate, 1,10-decanediol di(meth)acrylate, 1,6-hexanediol di(meth)acrylate, neopentyl glycol adipate di(meth)acrylate, hydroxypivalic acid neopentyl glycol di(meth)acrylate, caprolactone-modified dicyclopentenyl di(meth)acrylate, ethylene oxide-modified phosphoric acid di(meth)acrylate, di(acryloxyethyl)isocyanurate, and allylated cyclohexyl di(meth)acrylate; trifunctional (meth)acrylic acid derivatives such as trimethylolpropane tri(meth)acrylate, pentaerythritol tri(meth)acrylate, propionic acid-modified dipentaerythritol tri(meth)acrylate, propylene oxide-modified trimethylolpropane tri(meth)acrylate, and tris(acryloxyethyl)isocyanurate; tetrafunctional (meth)acrylic acid derivatives such as pentaerythritol tetra(meth)acrylate; pentafunctional (meth)acrylic acid derivatives such as propionic acid-modified dipentaerythritol penta(meth)acrylate; hexafunctional (meth)acrylic acid derivatives such as dipentaerythritol hexa(meth)acrylate and caprolactone-modified dipentaerythritol hexa(meth)acrylate; and the like.

Among these, bifunctional (meth)acrylic acid derivatives such as tricyclodecanedimethanol di(meth)acrylate, polyethylene glycol di(meth)acrylate, propoxylated-ethoxylated bisphenol A di(meth)acrylate, ethoxylated bisphenol A di(meth)acrylate, tricyclodecanedimethanol di(meth)acrylate, 1,10-decanediol di(meth)acrylate, 1,6-hexanediol di(meth)acrylate, neopentyl glycol adipate di(meth)acrylate, hydroxypivalic acid neopentyl glycol di(meth)acrylate, caprolactone-modified dicyclopentenyl di(meth)acrylate, ethylene oxide-modified phosphoric acid di(meth)acrylate, di(acryloxyethyl)isocyanurate, and allylated cyclohexyl di(meth)acrylate are preferable due to high miscibility with the thermoplastic resin (A).

These polyfunctional curable monomers may be used either alone or in combination.

The mass ratio (monofunctional curable monomer (B): polyfunctional curable monomer) of the monofunctional curable monomer (B) to the polyfunctional curable monomer is preferably 10:0 to 4:6.

The mass ratio (monofunctional curable monomer (B): polyfunctional curable monomer) of the monofunctional curable monomer (B) to the polyfunctional curable monomer is more preferably 10:0 to 5:5, and still preferably 10:0 to 6:4, since a cured resin formed article having low birefringence can be obtained.

Initiator (C)

The curable resin composition according to one embodiment of the invention may optionally include an initiator (C). The initiator (C) is not particularly limited as long as the initiator (C) initiates a curing reaction. Examples of the initiator (C) include a thermal initiator and a photoinitiator.

Examples of the thermal initiator include an organic peroxide and an azo compound.

Examples of the organic peroxide include dialkyl peroxides such as di-t-butyl peroxide, t-butylcumyl peroxide, and dicumyl peroxide; diacyl peroxides such as acetyl peroxide, lauroyl peroxide, and benzoyl peroxide; ketone peroxides such as methyl ethyl ketone peroxide, cyclohexanone peroxide, 3,3,5-trimethylcyclohexanone peroxide, and methylcyclohexanone peroxide; peroxy ketals such as 1,1-bis(t-butylperoxy)cyclohexane; hydroperoxides such as t-butyl hydroperoxide, cumene hydroperoxide, 1,1,3,3-tetramethylbutyl hydroperoxide, p-menthane hydroperoxide, diisopropylbenzene hydroperoxide, and 2,5-dimethylhexane-2,5-dihydroperoxide; peroxy esters such as t-butylperoxy acetate, t-butyl peroxy-2-ethylhexanoate, t-butyl peroxybenzoate, and t-butyl peroxyisopropylcarbonate; and the like.

Examples of the azo compound include 2,2'-azobis(4-methoxy-2,4-dimethylvaleronitrile), 2,2'-azobis(2-cyclopropylpropionitrile), 2,2'-azobis(2,4-dimethylvaleronitrile), azobisisobutyronitrile, 2,2'-azobis(2-methylbutyronitrile), 1,1'-azobis(cyclohexane-1-carbonitrile), 2-(carbamoylazo)isobutyronitrile, 2-phenylazo-4-methoxy-2,4-dimethylvaleronitrile, and the like.

Examples of the photoinitiator include alkylphenone-based photoinitiators such as 2,2-dimethoxy-1,2-diphenylethane-1-one, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-[4-[4-(2-hydroxy-2-methylpropionyl)benzyl]phenyl]-2-methylpropan-1-on e, 2-methyl-1-(4-methylthiophenyl)-2-morpholinopropan-1-one, 2-benzyl-2-dimethylamino-1-(4-morpholinophenyl)butanone-1, and 2-(dimethylamino)-2-[(4-methylphenyl)methyl]-1-[4-(4-morpholinyl)phenyl]-1-butanone; phosphorus-based photoinitiators such as 2,4,6-trimethylbenzoyldiphenylphosphine oxide, bis(2,4,6-trimethylbenzoyl)phenylphosphine oxide, ethyl(2,4,6-trimethylbenzoyl)phenyl phosphinate, and bis(2,6-dimethoxybenzoyl)-2,4,4-trimethylpentylphosphine oxide; titanocene-based photoinitiators such as bis($\eta^5$-2,4-cyclopentadien-1-yl)-bis[2,6-difluoro-3-(1H-pyrrol-1-yl)-phenyl]titanium; oxime ester-based photoinitiators such as 1,2-octanedione-1-[4-(phenylthio)-2-(O-benzoyloxime)] and ethanone-1-[9-ethyl-6-(2-methylbenzoyl)-9H-carbazol-3-yl]-1-(O-acetyloxime); benzophenone-based photoinitiators such as benzophenone, p-chlorobenzophenone, benzoylbenzoic acid, methyl o-benzoylbenzoate, 4-methylbenzophenone, 4-phenylbenzophenone, hydroxybenzophenone, acrylated benzophenone, 4-benzoyl-4'-methyldiphenyl sulfide, 3,3'-dimethyl-4-methoxybenzophenone, 2,4,6-trimethylbenzophenone, and 4-(13-acryloyl-1,4,7,10,13-pentaoxamidecyl)benzophenone; thioxanthone-based photoinitiators such as thioxanthone, 2-chlorothioxanthone, 3-methylthioxanthone, 2,4-dimethylthioxanthone, 2,4-diisopropylthioxanthone, 2,4-dichlorothioxanthone, 1-chloro-4-propoxythioxanthone, 2-methylthioxanthone, 2-isopropylthioxanthone, and 4-isopropylthioxanthone; and the like.

Among these, the alkylphenone-based photoinitiators and the phosphorus-based photoinitiators are preferable since the curing reaction proceeds efficiently. When the thermoplastic resin (A) includes an aromatic ring, the aromatic ring may absorb ultraviolet rays, and the curing reaction may occur to only a small extent. In such a case, the curing reaction can be effected using light having a wavelength longer than that of light that is absorbed by the aromatic ring by utilizing the phosphorus-based photoinitiator.

These initiators (C) may be used either alone or in combination.

The curable resin composition preferably includes the initiator (C) in a ratio of 0.05 to 15 mass %, more preferably 0.1 to 10 mass %, and still more preferably 0.3 to 5 mass %, based on the curable resin composition.

A photopolymerization promoter such as triisopropanolamine or 4,4'-diethylaminobenzophenone may be used in combination with the initiator (C).

The curable resin composition may include an additional component as long as the object and the advantageous effects of the invention are not impaired. Examples of the additional component include a plasticizer, an antioxidant, a UV absorber, and the like.

The curable resin composition may be prepared by mixing the thermoplastic resin (A), the monofunctional curable monomer (B), and an optional additional component, and dissolving or dispersing the mixture in an appropriate solvent, for example.

The solvent is not particularly limited as long as the thermoplastic resin (A) and the monofunctional curable monomer (B) can be dissolved or dispersed therein. Examples of the solvent include aliphatic hydrocarbon-based solvents such as n-hexane and n-heptane; alicyclic hydrocarbon-based solvents such as cyclopentane and cyclohexane; aromatic hydrocarbon-based solvents such as toluene and xylene; halogenated hydrocarbon-based solvents such as methylene chloride, ethylene chloride, and dichloromethane; alcohol-based solvents such as methanol, ethanol, propanol, butanol, and propylene glycol monomethyl ether; ketone-based solvents such as acetone, methyl ethyl ketone, 2-pentanone, isophorone, and cyclohexanone; ester-based solvents such as ethyl acetate and butyl acetate; cellosolve-based solvents such ethylcellosolve; ether-based solvents such as 1,3-dioxolane; and the like.

2) Curable Resin Formed Article

A curable resin formed article according to one embodiment of the invention is obtained by forming the curable resin composition according to one embodiment of the invention. The shape of the curable resin formed article according to one embodiment of the invention is not particularly limited. For example, the curable resin formed article may be in the shape of a film, a sheet, pellets, a rectangular parallelepiped, or the like. It is preferable that the curable resin formed article be in the shape of a film or a sheet. The curable resin formed article in the shape of a film or a sheet (film-like or sheet-like curable resin formed article) need not necessarily be a long curable resin formed article, but may be a short and flat curable resin formed article.

The film-like or sheet-like curable resin formed article according to one embodiment of the invention may be hereinafter referred to as "curable resin film".

The curable resin film according to one embodiment of the invention may be produced by a solution casting method using the curable resin composition. Specifically, the curable resin film according to one embodiment of the invention may be produced by applying the curable resin composition (or a solution prepared by diluting the curable resin composition with an appropriate solvent) to a casting sheet, and removing the solvent by drying. Examples of the solvent with which the curable resin composition is diluted include those mentioned above in connection with preparation of the curable resin composition.

The curable resin composition may be applied to the casting sheet using an arbitrary method. For example, a known coating method such as a spin coating method, a spray coating method, a bar coating method, a knife coating method, a roll coating method, a blade coating method, a die coating method, or a gravure coating method may be used.

A film obtained by applying the curable resin composition may be dried using an arbitrary method. For example, a known drying method such as hot-air drying, heat roll drying, or infrared irradiation may be used to obtain the curable resin film.

The drying temperature employed when drying the film is normally 30 to 150° C., and preferably 50 to 130° C. The drying time is normally several tens of seconds to several tens of minutes. The curable resin composition according to one embodiment of the invention includes the thermoplastic resin (A) that has a very high glass transition temperature (Tg). However, the solvent can be efficiently removed since the curable resin composition includes the monofunctional curable monomer (B).

The thickness of the curable resin film is not particularly limited. The thickness of the curable resin film is normally 1 to 300 μm, preferably 2 to 200 μm, and still more preferably 3 to 100 μm.

Since the curable resin composition according to one embodiment of the invention includes the monofunctional curable monomer (B), and is plasticized, the solvent can be efficiently removed during the drying step when producing the curable resin film using a solution casting method. The glass transition temperature (Tg) of the curable resin formed article (curable resin film) is normally −40 to +135° C., and preferably −40 to +130° C.

3) Cured Resin Formed Article

A cured resin formed article according to one embodiment of the invention is obtained by curing the curable resin formed article according to one embodiment of the invention. The shape of the cured resin formed article according to one embodiment of the invention is not particularly limited. For example, the cured resin formed article may be in the shape of a film, a sheet, a rectangular parallelepiped, or the like. It is preferable that the cured resin formed article be in the shape of a film or a sheet.

The film-like or sheet-like cured resin formed article according to one embodiment of the invention may be hereinafter referred to as "cured resin film".

The thickness of the cured resin formed article is not particularly limited, and may be determined taking account of the intended use. The thickness of the cured resin formed article is normally 1 to 300 μm, preferably 2 to 200 μm, and still more preferably 3 to 100 μm.

When the cured resin formed article is in the shape of a film or a sheet, the cured resin formed article may include a casting sheet. The casting sheet is removed in a given step. When the cured resin film according to one embodiment of the invention includes the casting sheet, the handling capability of the cured resin film does not deteriorate even when the cured resin film has a small thickness.

Since the cured resin formed article according to one embodiment of the invention includes the thermoplastic resin (A), the cured resin formed article exhibits excellent heat resistance. The glass transition temperature (Tg) of the cured resin formed article according to one embodiment of the invention is normally 140° C. or more, and preferably 150° C. or more.

The cured resin formed article according to one embodiment of the invention is obtained using a combination of the thermoplastic resin (A) and the monofunctional curable monomer (B), and has heat resistance and low birefringence.

A film obtained using a solution casting method has a problem in that the molecular chain may be oriented in the thickness direction during the solvent drying/removal step, and an increase in retardation in the thickness direction may easily occur. However, a cured resin formed article having low birefringence can be obtained by utilizing the curable resin composition according to one embodiment of the invention. Moreover, since the drying time can be reduced, in-plane retardation and retardation in the thickness direction can be reduced.

It is preferable that the cured resin formed article according to one embodiment of the invention be colorless and transparent. When the thermoplastic resin (A) includes an aromatic ring, the curing reaction may occur to only a small extent, and a deterioration in the resin or coloration of the cured resin formed article may occur depending on the irradiation conditions. In order to prevent these problems, it is preferable to provide an active energy ray irradiation apparatus with a UV-cut filter so that only light having a wavelength necessary for the curing reaction is applied. A resin film (e.g., polyethylene terephthalate film) that does not allow light having a wavelength unnecessary for the curing reaction may be used instead of the UV-cut filter.

For example, when active energy rays are applied to the curable resin film in a state in which a polyethylene terephthalate film (PET film) is stacked on the curable resin film, light having a wavelength unnecessary for the curing reaction does not pass through the PET film, and a deterioration in the resin or coloration of the cured resin formed article can be prevented.

The cured resin formed article according to one embodiment of the invention is obtained using a combination of the thermoplastic resin (A) and the monofunctional curable monomer (B), and has low birefringence.

In particular, the cured resin formed article according to one embodiment of the invention has small in-plane retardation ($R_{in}$) and small retardation ($R_{th}$) in the thickness direction (see the following expressions).

Note that $n_x$ is the refractive index in the plane of the cured resin formed article in the direction in which the refractive index is a maximum, $n_y$ is the refractive index in the plane of the cured resin formed article in the orthogonal direction with respect to the refractive index $n_x$, and $n_z$ is the refractive index in the vertical direction with respect to the plane of the cured resin formed article. d is the thickness of the cured resin formed article.

$$R_{in} = (n_x - n_y) \times d$$

$$R_{th} = \left(n_z - \frac{n_x + n_y}{2}\right) \times d$$

The cured resin formed article according to one embodiment of the invention normally has an in-plane retardation ($R_{in}$) of 20 nm or less, and preferably 15 nm or less.

It is preferable that the in-plane retardation ($R_{in}$) be as small as possible. The lower limit of the in-plane retardation ($R_{in}$) is not particularly limited, but is normally 0.1 nm or more.

The absolute value of the retardation ($R_{th}$) in the thickness direction is normally 500 nm or less, preferably 450 nm or less, more preferably 300 nm or less, and still more preferably 100 nm or less. It is preferable that the absolute value of the retardation ($R_{th}$) in the thickness direction be as small as possible. The lower limit of the absolute value of the retardation ($R_{th}$) in the thickness direction is not particularly limited, but is normally 1 nm or more.

The absolute value of a value (i.e., the birefringence in the thickness direction) obtained by dividing the retardation in the thickness direction by the thickness of the film is normally $10 \times 10^3$ or less, preferably $9 \times 10^3$ or less, more preferably $5 \times 10^{-3}$ or less, and still more preferably $1 \times 10^{-3}$ or less. It is preferable that the absolute value of the birefringence in the thickness direction be as small as possible. The lower limit of the absolute value of the birefringence in the thickness direction is not particularly limited, but is normally $0.1 \times 10^{-5}$ or more, and preferably $1 \times 10^{-5}$ or more.

When the curable resin formed article includes a photoinitiator, the cured resin formed article according to one embodiment of the invention may be cured by applying active energy rays. This curing method is described in detail later in connection with the method for producing a cured resin formed article.

When applying active energy rays to the curable resin formed article, it is preferable to apply active energy rays through a UV-cut filter so that only light having a wavelength necessary for the curing reaction is applied to the curable resin formed article in order to prevent a deterioration in the thermoplastic resin (A).

In this case, since light having a wavelength of 320 nm or less that is unnecessary for the curing reaction does not pass through the UV-cut filter, a deterioration in the thermoplastic resin (A) or coloration of the cured resin formed article can be prevented.

4) Method for Producing Cured Resin Formed Article

The cured resin fainted article according to one embodiment of the invention may be produced using an arbitrary method. The cured resin formed article according to one embodiment of the invention may be produced using a known method. For example, the cured resin formed article may be produced using a method that extrudes the curable resin composition, and cures the curable resin composition by applying active energy rays or the like, or method that forms the curable resin composition using a solution casting method, and cures the curable resin composition by applying active energy rays or the like. It is preferable to use the latter method since in-plane retardation can be reduced.

The wavelength of the active energy rays is preferably 200 to 400 nm, and more preferably 320 to 400 nm. The active energy rays may be applied using a high-pressure mercury lamp, an electrodeless lamp, a xenon lamp, or the like. The intensity is normally 50 to 1000 mW/cm$^2$, and the dose is normally 50 to 10,000 mJ/cm$^2$, and preferably 1000 to 10,000 mJ/cm$^2$. The irradiation time is normally 0.1 to 1000 seconds, preferably 1 to 500 seconds, and more preferably 10 to 100 seconds. The active energy rays may be applied a plurality of times so that the dose falls within the above range taking account of the thermal load during the active energy ray irradiation step.

If the dose exceeds 10,000 mJ/cm$^2$, the cured resin formed article may be colored. If the dose is less than 50 mJ/cm$^2$, the curing reaction may not proceed sufficiently, and the monofunctional curable monomer (B) may remain unreacted.

The cured resin formed article may be obtained by applying electron beams as the active energy rays. Electron beams may be applied using an electron beam accelerator or the like. The dose is normally 10 to 1000 krad. The irradiation time is normally 0.1 to 1000 seconds, preferably 1 to 500 seconds, and more preferably 10 to 100 seconds.

When producing a film-like or sheet-like cured resin formed article (cured resin film), it is preferable to produce the cured resin formed article using a casting sheet since the cured resin formed article can be efficiently produced, and the resulting cured resin film can be protected during storage, transportation, and the like.

When using a casting sheet, the cured resin film may be producing using a method that includes the following steps 1 and 2, for example.

Step 1: A step that forms a curable resin layer on a casting sheet, the curable resin layer being formed of a curable resin composition that includes the thermoplastic resin (A) and the monofunctional curable monomer (B)

Step 2: A step that cures the curable resin layer obtained by the step 1 to form a cured resin layer In the step 1, the curable resin layer may be formed using the method described above in connection with the curable resin formed article according to one embodiment of the invention.

For example, the curable resin composition that includes the thermoplastic resin (A) and the monofunctional curable monomer (B) (or a solution prepared by diluting the curable resin composition with an appropriate solvent) is applied to the casting sheet, and the solvent is removed by drying to form the curable resin layer.

In the step 2, the curable resin layer may be cured using the method described above in connection with the curable resin formed article according to one embodiment of the invention to form the cured resin layer.

The curable resin layer may be cured by appropriately employing the above method.

For example, when the curable resin layer includes a photoinitiator, it is preferable to cure the curable resin layer by applying active energy rays.

The active energy rays are preferably applied at an intensity of 50 to 1000 mW/cm$^2$. The active energy rays are preferably applied at a dose of 50 to 10,000 mJ/cm$^2$, and more preferably 1000 to 10,000 mJ/cm$^2$. The irradiation time is 0.1 to 1000 seconds, preferably 1 to 500 seconds, and more preferably 10 to 100 seconds. The active energy rays are preferably applied a plurality of times so that the dose falls within the above range taking account of the thermal load during the irradiation step.

It is preferable to apply the active energy rays to the curable resin layer through a UV-cut filter so that only light having a wavelength necessary for the curing reaction is applied to the curable resin layer in order to prevent a deterioration in the thermoplastic resin (A). A resin film (e.g., polyethylene terephthalate film) may be used instead of the UV-cut filter.

When using a resin film, the resin film may be stacked on the curable resin layer before the step 2.

A cured resin film provided with the casting sheet can be obtained using the above method.

The casting sheet is normally removed in a given step taking account of the application of the cured resin film. Although the method that includes the steps 1 and 2 forms the cured resin film utilizing the casting sheet, the cured resin film obtained by the method may or may not include the casting sheet.

5) Laminate

A laminate according to one embodiment of the invention includes at least one layer that is formed of a cured resin obtained by curing the curable resin composition according to one embodiment of the invention.

The laminate according to one embodiment of the invention may include an additional layer. The additional layer is not particularly limited. Examples of the additional layer include a hard coat layer, a refractive index-adjusting layer, a primer layer, an optical diffusion layer, an anti-glare treatment layer, a gas barrier layer, a transparent conductive layer, a casting sheet, and the like.

The hard coat layer is provided to implement an improvement in scratch resistance and the like. The hard coat layer is obtained by forming a cured film on the surface of the cured resin film using a curable resin, for example. Examples of the curable resin include UV-curable resins such as a silicon-based resin, a urethane-based resin, an acrylic-based resin, and an epoxy-based resin, and the like.

The refractive index-adjusting layer is provided to control reflection. The refractive index-adjusting layer may be formed using a high-refractive-index material or a low-refractive-index material so that the desired performance is obtained.

The primer layer is provided to improve surface adhesion. The primer layer may be formed using a known method.

The optical diffusion layer is provided to diffuse light, and can increase the viewing angle of a liquid crystal display and the like. The optical diffusion layer may be formed using a known method.

The anti-glare treatment layer is provided to prevent a situation in which it is difficult to observe the transmitted light due to reflection of external light from the surface of the cured resin film, for example. The anti-glare treatment layer may be formed by a known method using a coating agent that includes a filler (e.g., silica particles).

The gas barrier layer suppresses transmission of oxygen and water vapor. Examples of the gas barrier layer include a layer that is formed of an inorganic deposited film, a layer that includes a gas barrier resin, a layer obtained by implanting ions into a layer that includes a polymer compound, and the like. The gas barrier layer may be formed using a known method.

The transparent conductive layer is transparent, and exhibits conductivity. Examples of a material for forming the transparent conductive layer include semiconducting metal oxides such as indium tin oxide (ITO) and indium zinc oxide (IZO). The transparent conductive layer may be formed by an evaporation (deposition) method, a sputtering method, an ion plating method, a thermal CVD method, a plasma CVD method, or the like.

The casting sheet is normally stacked as the outermost layer of the cured resin film, and protects the cured resin film during storage, transportation, and the like. The casting sheet is removed in a given step. A plastic film such as a polyethylene terephthalate film may be used directly as the casting sheet, or the casting sheet may be prepared by applying a release agent to paper, a plastic film, or the like to form a release agent layer.

The thickness of the laminate according to one embodiment of the invention is not particularly limited, and may be appropriately determined taking account of the application of the desired electronic device and the like. The substantial thickness of the laminate is normally 1 to 300 μM, preferably 2 to 200 μm, and still more preferably 3 to 100 μm.

The term "substantial thickness" used herein refers to the thickness of the laminate in a usage state. Specifically, when the laminate according to one embodiment of the invention includes the casting sheet and the like, the thickness of the part (e.g., casting sheet) that is removed before use is excluded from the substantial thickness.

The laminate according to one embodiment of the invention may suitably be used as an electrode material for a touch panel and the like, a flat-screen television, an optical recording medium, and an optical sheet material.

EXAMPLES

The invention is further described below by way of examples. Note that the invention is not limited to the following examples.

Example 1

50 parts by mass of pellets of a polyarylate-based resin (PAR) ("U-Polymer P-1001A" manufactured by Unitika Ltd., Tg=195° C.) were dissolved in dichloromethane to prepare a 15 mass % solution. After the addition of 47 parts by mass of N-acryloylmorpholine ("ACMO" manufactured by Kohjin Co., Ltd.) and 3 parts by mass of 1-hydroxycyclohexyl phenyl ketone ("Irgacure 184" manufactured by BASF) to the solution, the components were mixed to prepare a curable resin composition A.

The curable resin composition A was applied to the surface of a polyethylene terephthalate (PET) film ("PET 50A-4100" manufactured by Toyobo Co., Ltd., thickness: 50 µm) (casting sheet) opposite to the primer layer using a fountain die method so that the thickness after drying was 50 µm. The resulting film was heated (dried) at 50° C. for 2 minutes and at 130° C. for 2 minutes to obtain a curable resin film A (film-like curable resin formed article).

After stacking a PET film ("PET 50A-4100" manufactured by Toyobo Co., Ltd., thickness: 50 µm) on the curable resin film A so that light having a wavelength unnecessary for a curing reaction did not pass through, ultraviolet rays were applied to the curable resin film A using a belt conveyer-type UV irradiation apparatus ("ECS-401GX" manufactured by Eye Graphics Co., Ltd.) and a high-pressure mercury lamp ("H04-L41" manufactured by Eye Graphics Co., Ltd.) (height of UV lamp: 150 mm, output of UV lamp: 3 kW (120 mW/cm), wavelength: 365 nm, intensity: 271 mW/cm$^2$, dose: 177 mJ/cm$^2$ (UV meter: "UV-351" manufactured by ORC Manufacturing Co., Ltd.). Next, ultraviolet rays were applied twice using the UV irradiation apparatus (height of UV lamp: 150 mm, wavelength: 365 nm, intensity: 271 mW/cm$^2$, dose: 600 mJ/cm$^2$) (total dose: 1377 mJ/cm$^2$) to effect a curing reaction to obtain a cured resin film A. Note that the cured resin film from which the PET film was removed was used as the measurement sample (hereinafter the same (Examples 2 to 9 and Comparative Example 1)).

Examples 2 to 9 and Comparative Example 1

Curable resin compositions B to J were prepared in the same manner as in Example 1, except that each component was used in the amount shown in Table 1. Curable resin films B to J (film-like curable resin formed articles) were obtained in the same manner as in Example 1 using the curable resin compositions B to J, respectively.

The details of the compounds used in Examples 2 to 9 and Comparative Example 1 are shown below.
Thermoplastic Resin
Polyarylate-based resin (PAR): "U-Polymer P-1001A" manufactured by Unitika Ltd., Tg=195° C.
Polyethersulfone-based resin (PES): "ULTRASON E 2010" manufactured by BASF, Tg=225° C.
Polysulfone-based resin (PSF): "ULTRASON S 3010" manufactured by BASF, Tg=180° C.
Alicyclic hydrocarbon-based resin (COC): ("TOPAS 6017" manufactured by Polyplastics Co., Ltd., Tg=180° C.
Polycarbonate-based resin (PC): "Tarflon LS1700" manufactured by Idemitsu Kosan Co., Ltd., Tg=145° C.
Monofunctional Monomer
N-Acryloylmorpholine: "ACMO" manufactured by Kohjin Co., Ltd.
Dimethylacrylamide: "DMAA" manufactured by Kohjin Co., Ltd.
Phenoxy polyethylene glycol acrylate: "V#192" manufactured by Osaka Organic Chemical Industry Ltd.
Benzyl acrylate: "V#160" manufactured by Osaka Organic Chemical Industry Ltd.
Isobornyl acrylate: "IBXA" manufactured by Osaka Organic Chemical Industry Ltd.
Cyclohexyl acrylate: "V#155" manufactured by Osaka Organic Chemical Industry Ltd.
1-Adamantyl acrylate: "ADAMANTATE X-A-101" manufactured by Idemitsu Kosan Co., Ltd.
Ethoxylated o-phenylphenol acrylate: "A-LEN-10" manufactured by Shin-Nakamura Chemical Co., Ltd.
Polyfunctional Monomer
Tricyclodecanedimethanol diacrylate: "ADCP" manufactured by Shin-Nakamura Chemical Co., Ltd.
Ethoxylated bisphenol A diacrylate: "ABE-300" manufactured by Shin-Nakamura Chemical Co., Ltd.
Initiator
1-Hydroxycyclohexyl phenyl ketone: "Irgacure 184" manufactured by BASF Comparative Example 2

A resin film 1r (thickness: 50 µm) was formed by a melt extrusion method using pellets of a polyarylate-based resin ("U-Polymer P-1001A" manufactured by Unitika Ltd., Tg=195° C.).

Comparative Example 3

Pellets of a polyarylate-based resin ("U-Polymer P-1001A" manufactured by Unitika Ltd., Tg=195° C.) were dissolved in dichloromethane to prepare a 15 wt % solution.

The solution was applied to the surface of a polyethylene terephthalate (PET) film ("PET 50A-4100" manufactured by Toyobo Co., Ltd., thickness: 50 µm) (casting sheet) opposite to the primer layer using a fountain die method so that the thickness after drying was 50 µm. The resulting film was heated (dried) at 50° C. for 2 minutes and at 130° C. for 2 minutes to obtain a resin film 2r.

The glass transition temperature (Tg) of the resins used in the examples and comparative examples was measured as described below. Specifically, each resin was subjected to viscoelasticity measurement (frequency: 11 Hz, temperature increase rate 3° C./min, temperature range: 0 to 250° C., tensile mode) using a viscoelasticity measurement apparatus ("DMA Q800" manufactured by TA Instruments Japan Inc.), and the temperature corresponding to the maximum tan δ value (loss modulus/storage modulus) obtained by the viscoelasticity measurement was taken as the glass transition temperature (Tg).
Birefringence of Cured Resin Film The refractive index ($n_x$, $n_y$, $n_z$) of the resin films obtained in the examples and comparative examples was measured at 23° C. using a retardation measurement apparatus ("KOBRA-WR" manufactured by Oji Scientific Instruments, wavelength: 589 nm). Note that $n_x$ is the refractive index in the plane of the film in the direction in which the refractive index is a maximum, $n_y$ is the refractive index in the plane of the film in the orthogonal direction with respect to the refractive index $n_x$, and $n_z$ is the refractive index in the vertical direction with respect to the plane of the film.

The in-plane retardation and the retardation in the thickness direction of the film were calculated by the following expressions. Note that $R_{in}$ and $R_{th}$ are respectively the in-plane retardation and the retardation in the thickness direction, and d is the thickness of the film.

A value obtained by dividing the retardation ($R_{th}$) in the thickness direction by the thickness (d) of the film was taken as the birefringence in the thickness direction.

$$R_{in} = (n_x - n_y) \times d$$

$$R_{th} = \left(n_z - \frac{n_x + n_y}{2}\right) \times d$$

TABLE 1

| | | Example | | | | | | | | | Comparative Example | | |
|---|---|---|---|---|---|---|---|---|---|---|---|---|---|
| | | 1 | 2 | 3 | 4 | 5 | 6 | 7 | 8 | 9 | 1 | 2 | 3 |
| Thermoplastic resin (A) | Polyarylate-based resin | 50 | 70 | — | — | — | — | — | — | — | 70 | 100 | 100 |
| | Polyethersulfone-based resin | — | — | 70 | — | — | — | — | — | — | — | — | — |
| | Polysulfone-based resin | — | — | — | 60 | 35 | — | — | — | — | — | — | — |
| | Alicyclic hydrocarbon-based resin | — | — | — | — | — | 85 | 50 | 40 | — | — | — | — |
| | Polycarbonate-based resin | — | — | — | — | — | — | — | — | 90 | — | — | — |
| Monofunctional curable monomer (B) | Acryloylmorpholine | 47 | — | — | 19 | — | — | — | — | — | — | — | — |
| | Dimethylacrylamide | — | 27 | — | — | — | — | — | — | — | — | — | — |
| | Phenoxy polyethylene glycol acrylate | — | — | 27 | — | — | — | — | — | — | — | — | — |
| | Benzyl acrylate | — | — | — | — | 40 | — | — | — | — | — | — | — |
| | Isobornyl acrylate | — | — | — | — | — | 12 | — | — | — | — | — | — |
| | Cyclohexyl acrylate | — | — | — | — | — | — | 47 | — | — | — | — | — |
| | Adamantane acrylate | — | — | — | — | — | — | — | 55 | — | — | — | — |
| | Ethoxylated o-phenylphenol acrylate | — | — | — | — | — | — | — | — | 17 | — | — | — |
| Polyfunctional monomer | Tricyclodecanedimethanol diacrylate | — | — | — | 19 | — | — | — | — | — | — | — | — |
| Initiator | Ethoxylated bisphenol A diacrylate | — | — | — | — | 22 | — | — | — | — | 27 | — | — |
| | 1-Hydroxycyclohexyl phenyl ketone | 3 | 3 | 3 | 2 | 3 | 3 | 3 | 5 | 3 | 3 | — | — |
| Cured resin film | | A | B | C | D | E | F | G | H | I | J | — | — |
| In-plane retardation (nm) | | 5 | 8 | 8 | 6 | 6 | 2 | 3 | 2 | 8 | 18 | 20 | 10 |
| Retardation (nm) in thickness direction | | −200 | −300 | −350 | −20 | −15 | −120 | −80 | −30 | −350 | −800 | 300 | −900 |
| Thickness (μm) of cured resin film | | 50 | 50 | 50 | 50 | 50 | 49 | 50 | 52 | 50 | 50 | 50 | 50 |
| Birefringence in thickness direction (retardation in thickness direction/thickness of cured resin film) (×10⁻³) | | −4.0 | −6.0 | −7.0 | −0.4 | −0.3 | −2.4 | −1.6 | −0.6 | −7.0 | −16.0 | 6.0 | −18.0 |

The following were confirmed from the results shown in Table 1.

The cured resin films A to I obtained in Examples 1 to 9 had small in-plane retardation, small retardation in the thickness direction, and low birefringence.

The cured resin film J of Comparative Example 1 that was obtained using the polyfunctional monomer instead of the monofunctional curable monomer, the resin film of Comparative Example 2 that was obtained by a melt extrusion method without using a monofunctional curable monomer, and the resin film of Comparative Example 3 that was obtained by a solution casting method without using a monofunctional curable monomer, had large in-plane retardation, large retardation in the thickness direction, and high birefringence as compared with the cured resin films A to I obtained in Examples 1 to 9.

7. The curable resin composition according to claim 1, wherein the monofunctional curable monomer (B) is at least one monomer selected from the group consisting of dimethylacrylamide, isobornyl(meth)acrylate, cyclohexyl(meth)acrylate, 1-adamantyl(meth)acrylate, 2-adamantyl(meth)acrylate, ethoxylated o-phenylphenol(meth)acrylate, phenoxy polyethylene glycol(meth)acrylate, benzyl(meth)acrylate, and N-(meth)acryloylmorpholine shown by the following formulas:
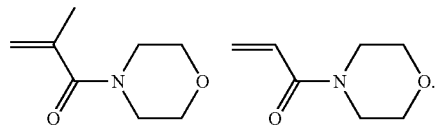

The invention claimed is:

1. A curable resin composition comprising a thermoplastic resin (A) that includes a cyclic structure in its main chain, and has a glass transition temperature (Tg) of 140° C. or more, and a monofunctional curable monomer (B),
   wherein the thermoplastic resin (A) is at least one thermoplastic resin selected from the group consisting of a polysulfone-based resin, a polyarylate-based resin, and an alicyclic hydrocarbon-based resin,
   wherein the monofunctional curable monomer (B) is at least one monofunctional (meth)acrylic acid derivative selected from the group consisting of a (meth)acrylic acid derivative that includes a nitrogen atom, a (meth)acrylic acid derivative having an alicyclic structure, and a (meth)acrylic acid derivative having an ether structure, and
   wherein the curable resin composition includes the thermoplastic resin (A) and the monofunctional curable monomer (B) in a mass ratio (thermoplastic resin (A):monofunctional curable monomer (B)) of 3:7 to 9:1.

2. A curable resin formed article obtained by forming the curable resin composition according to claim 1.

3. The curable resin formed article according to claim 2, the curable resin formed article being a film-like article.

4. A cured resin formed article obtained by curing the curable resin formed article according to claim 2.

5. A method for producing the cured resin formed article according to claim 4, the method comprising:
   a step 1 that forms a curable resin layer on a casting sheet, the curable resin layer being formed of the curable resin composition that includes the thermoplastic resin (A) and the monofunctional curable monomer (B); and
   a step 2 that cures the curable resin layer obtained by the step 1 to form a cured resin layer.

6. A laminate comprising at least one layer that is formed of a cured resin obtained by curing the curable resin composition according to claim 1.